United States Patent

[11] 3,591,900

[72] Inventor George M. Brown
St. Petersburg, Fla.
[21] Appl. No. 837,393
[22] Filed June 30, 1969
[45] Patented July 13, 1971
[73] Assignee Sauna International, Inc.
Miami, Fla.

[54] BELT ADJUSTER
3 Claims, 3 Drawing Figs.

[52] U.S. Cl. .................................................. 24/196
[51] Int. Cl. ...................................................... A44b 11/10, A44b 11/16
[50] Field of Search .......................................... 24/32, 196, 197, 171

[56] References Cited

UNITED STATES PATENTS

| 1,234,818 | 7/1917 | Sturrock | 24/196 |
| 1,374,691 | 4/1921 | Troop | 24/196 |
| 2,743,497 | 5/1956 | Davis | 24/196 |

Primary Examiner—George F. Mautz
Assistant Examiner—Milton Gerstein
Attorney—Fidelman, Wolffe and Leitner ABSTRACT: A belt adjuster provided with spaced parallel, offset fixed bars. A third reciprocating bar is disposed between the fixed bars and cooperates with one of the fixed bars to grip therebetween a looped end portion of a belt. The cooperating bars are purposely of noncomplimentary geometries to provide at least two lines of applied gripping pressure. The other of said fixed bars is offset with respect to the cooperating bars so that a moment of forces urges the looped end portion to bear against a rounded edge bearing surface of the crossbar to provide additional gripping pressure.

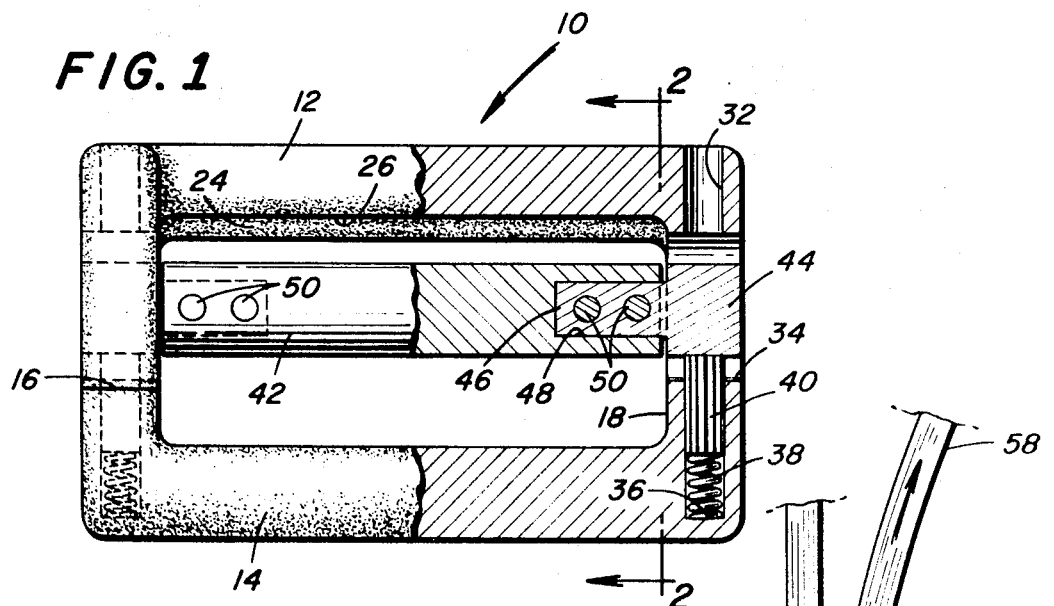

3,591,900

BELT ADJUSTER

The present invention relates to a belt adjuster adapted to receive opposed looped end portions of a belt, the length of which is to be adjusted. One looped end portion circumscribes a reciprocating cylindrical crossbar. Tension in the belt urges the crossbar into cooperation with a fixed bar of generally L-shaped cross section. The looped end portion of the belt is thus retained against slippage between two lines of applied gripping pressure provided by the cooperating purposely noncomplimentary geometries of the cylindrical crossbar and the L-shaped fixed crossbar. The belt tension further urges the end portion of the belt tightly against a rounded edge bearing surface of the fixed bar further preventing slippage in the belt. The remaining looped end portion of the belt is fixedly secured to another fixed bar which is parallel to the first fixed bar but offset therefrom so that tension in the belt produces a moment of forces to the belt adjuster which further promotes the desired gripping action thereof.

The belt adjuster according to the invention has particular application in removable attaching webbing or belts of a parachute harness to a user's body. Accordingly, the invention further is utilized such that the webbing or belts are always disposed against the user's body, thereby acting as cushions between the user and the belt adjuster according to the invention.

Accordingly, it is an object of the present invention to provide a belt adjuster which positively retains a belt looped end portion against slippage yet permits manual adjustment in the length of the looped end portion.

Another object of the invention is to provide a belt adjuster wherein gripping pressure upon a looped belt end portion increases with increasing tension in the belt.

Another object of the invention is to provide a belt adjuster wherein a belt looped end portion is retained against slippage along at least two lines of gripping pressure applied thereto.

Another object of the invention is to provide a belt adjuster wherein tension in the belt urges a reciprocating crossbar into cooperation with a fixed crossbar to apply gripping pressure upon a looped end portion of the belt, which belt tension further urges the looped end portion to impinge against a bearing surface of the fixed crossbar to provide additional gripping pressure thereto.

It is another object of the invention to provide a belt adjuster with offset crossbars, each adapted to receive thereover a looped end portion of a belt to be adjusted, the offset configuration of the crossbars imparting a moment of forces which improves the gripping action applied upon one of the belt loops.

A further object of the invention is to provide a belt adjuster adapted for receiving looped end portions of a belt, which end portions further act to cushion the belt adjuster against the body or article utilizing the belt adjuster.

A further object of the invention is to provide a belt adjuster which is structured to receive looped end portions of a belt and further acts to prevent twisting of the same.

Other objects and many attended advantages of the present invention will become apparent upon perusal of the following detailed description thereof taken in conjunction with the drawings wherein:

FIG. 1 is an elevation partly in section of the belt adjuster according to the present invention;

FIG. 2 is a section along the line 2-2 of FIG. 1 and further illustrating looped end portions of a belt received on the belt adjuster; and FIG. 3 is a side elevation of the device as illustrated in FIG. 1 and shown partly in section to particularly indicate the gripping action of the device.

With more particular reference to FIGS. 1 and 2, there is shown generally at 10 a preferred embodiment of the belt adjuster according to the invention. The device includes a first fixed crossbar 12 and a second fixed crossbar 14 parallel and in spaced relationship with respect to the first crossbar 12. The crossbars 12 and 14 are connected by extended, laterally spaced, parallel sidewall portions 16 and 18 which connect the crossbars 12 and 14 generally at their ends. The sidewalls 16 and 18 are of complimentary configurations. As shown in FIG. 2, the sidewall 16 comprises a rectangular portion 20 adjacent to and continuous with an inclined offset parallelogram portion 22. The first fixed crossbar 12 is generally of L-shaped cross section providing a reverse curved bearing surface 24 immediately adjacent a planar bearing surface 26. The gearing surface 26 is contiguous with a rounded edge portion 28 which, in turn, is contiguous with a planar bearing surface 30, at right angles with the bearing surface 26. As shown in FIG. 2, the rectangular portion 20 of the sidewall 16 extends partially beyond the dimensions of the crossbar 12 for a purpose to be described in detail.

With reference to FIGS. 1 and 2, the sidewall 16 is provided with an elongated generally cylindrical recess 32 disposed generally centrally of the rectangular portion 20 of the sidewall 16 and extending substantially the entire length thereof. Further the sidewall 16 is provided with a generally elongated aperture 34 extending transversely of the elongated recess 32 and in communication therewith. The bottom portion 36 of the elongated recess 32 is provided with a reduced diameter compressible coil spring 38. An elongated reduced diameter plunger 40 engages on the coil spring 38. As shown, the plunger 40 partially projects from the bottom portion 36 of the recess 32 into one rounded end portion of the aperture 34. It is noted that the sidewall 18 is provided with the same structure as the sidewall 16, but for purposes of clarity it is not necessary to describe such structure in detail.

With reference to both FIGS. 1 and 2, the device 10 is provided with a third crossbar 42 which is parallel to and disposed between the fixed crossbars 12 and 14. The crossbar 42 is of cylindrical configuration and its elongated cylindrical length spans between the spaced sidewalls 16 and 18. Each end of the crossbar 42 has secured thereto a projecting pin 44. The pin 44 is provided with a locating dowel of reduced diameter which is inserted in a complimentary recess 48 provided in the end of the crossbar 42. Each dowel 46 is secured to the crossbar 42 by rivets 50.

As shown in FIG. 2, the pin 44 is of generally elongated cross section and is adapted to be disposed slidably within the elongated slot 34. It is understood that the other end of the third crossbar 42 is provided with similar construction which is slidable, in similar fashion, within an elongated slot of the sidewall 18. Thus, as illustrated in FIGS. 1 and 2, the third crossbar 42 may be disposed for reciprocating motion in a direction normal to the planar surface 26 of the fixed crossbar 12. In its forwardmost position, to be described hereinafter, the cylindrical reciprocating crossbar 42 will cooperate with the planar bearing surface 26 and the arcuate bearing surface 24 of the fixed crossbar 12.

With more particular reference to FIG. 2, the second fixed crossbar 14 is generally cylindrical in configuration and is located in the offset portion 22 of the sidewall 16. As shown, the crossbar 14 is offset laterally from the longitudinal axis of the elongated slot 34 and thus is offset with respect to the direction of reciprocating motion of the constrained reciprocating crossbar 42. Further, the major axis of the crossbar 14 is offset laterally from the planar bearing surface 30 of the first fixed crossbar 12. A first end portion 52 of a webbing or belt 54 is looped in circumscribing relationship over the cylindrical fixed crossbar 14. The terminal end portion 56 of the looped end portion 52 may be secured to the remaining portion of the belt 54 by any well-known fastening technique. Accordingly, the looped end portion 52 is fixedly retained in circumscribing relationship on the fixed crossbar 14. In operation, the belt 54 is looped around a body or article, not shown. The remaining end portion 58 on the belt is looped in circumscribing relationship about the reciprocating crossbar 42 in a manner particularly illustrated in FIG. 2. Accordingly, the belt 54 is provided with a looped end portion 60 generally circumscribing the crossbar 42. The end portion 58 of the belt is not secured but is free to be manually adjusted in length so as to change the effective length of the belt 54.

With reference to FIG. 3, the terminal end portion 58 of the belt 54 is shown in a position considerably extended from that illustrated in FIG. 2. Such extension thereby creates a desired shorter effective length of the belt 54. With the belt 54 desirably adjusted, a tension force, as indicated by the arrows 62 will be present. Such tension forces are transmitted through the looped end portion 60 of the belt causing the cylindrical reciprocating crossbar 42 to be urged toward a forwardmost position impinging a portion of the belt against the bearing surfaces 24 and 26 of the fixed crossbar 12. The cylindrical reciprocating crossbar 42 and the bearing surfaces 24 and 26 are purposely of noncomplimentary geometries in order that the impinged portion of the belt is retained along two lines of applied gripping pressure which prevent slippage of the belt from its desired adjusted position. The sliding plunger 40 within the confines of the sidewall 16 is resiliently urged by the compressed coil spring 38 into engagement on the elliptical plug 44 which further urges the reciprocating crossbar to its forwardmost gripping position. The action of such plunger 40 is particularly desirable especially should the tension forces 62 of the belt become momentarily relaxed. Accordingly, the reciprocating crossbar 42 is maintained in its forwardmost position by the action of the sliding plunger 40 itself, or in cooperation with the presence of the tension forces 62 upon the looped end portion 60 of the belt.

With reference to FIG. 3, because of the offset configuration of the fixed crossbar 14, the presence of tension forces 62 will tend to produce a counterclockwise pivotal motion of the belt adjuster 10 about the central axis of the crossbar 14. Such tendency causes the looped end portion 60 of the belt to pinch the terminal end portion 58 of the belt against the bearing surface 30 and the rounded edge bearing surface 28 of the fixed crossbar 12. This action desirably serves as an additional safeguard to prevent slippage of the adjusted belt, and further acts to confine the terminal end portion 58 of the belt between the portions of the sidewalls 16 and 18 which project beyond the bearing surface 30 of the fixed crossbar 12. Thus, with the terminal end portion 58 of the belt thereby confined a tendency thereof to twist or to slip laterally off the rounded edge bearing surface 28 is prevented. Also, the planar bearing surface 26 is inclined to impart a reverse curve to the portion of the belt impinged on the bearing surfaces 26 and 28. The two lines of applied gripping pressure are advantageously applied upon a reverse curved portion of the belt, further guarding against slippage. In use, the belt end portions 52 and 60 may be disposed against an article or the body of a user so as to cushion the same from the relatively hard surfaces of the belt adjuster 10.

Loosening of the belt is accomplished in the following manner. With reference to both FIGS. 2 and 3, it will be seen that the former figure shows the belt adjuster position upon a user of the device manually grasping the same and imparting a clockwise pivotal motion thereto. With the adjuster thus positioned, the tension forces 62 will no longer be transmitted through the looped end portion 60 in a manner to urge the reciprocating crossbar 42 to its forwardmost position. Any number of techniques may be utilized to cause slippage and loosening of the belt about the reciprocating crossbar 42. For example, a user of the device may grasp the crossbar 48 by its end plugs 44 and urge the same against the action of the plungers 40. Many other techniques may be utilized singly or in combination to relieve the tension which tends to urge the reciprocating crossbar 42 to its forwardmost position. In order to retighten the belt, it is only necessary to pull manually the end portion 58 thereof, whereby such action straightens out the gripped portion of the belt between the crossbars 14 and 42, and prevents urging of the reciprocating crossbar 42 to its forwardmost pinching position. Thus further pulling of the belt and portion 58 causes tightening of the belt.

Although a preferred embodiment of the present invention has been particularly shown and described, other modifications and embodiments thereof may be utilized, either singly or in combination thereof to produce the same results as taught. For example, such additional modifications and embodiments may utilize the offset configuration of the crossbar 14 either singly or in combination with the noncomplimentary geometries of the fixed and reciprocating crossbars. Additionally, the geometries of the cooperating crossbars 12 and 42 may be of any configuration so long as they are noncomplimentary in order to provide at least two lines of applied gripping pressure therebetween. Accordingly, the spirit and scope of the invention is to be limited only in the scope of the appended claims, wherein:

What I claim is:

1. A belt adjuster comprising: first and second fixed parallel crossbars, a pair of sidewalls connecting said first and second crossbars, a third crossbar reciprocably mounted between said first and second crossbars, a belt having a first looped end portion fixedly secured on said second crossbar, a second looped end portion of said belt circumscribing said third crossbar, said third crossbar and said first crossbar cooperating to grip therebetween said second looped end portion, said third crossbar being generally cylindrical and said first crossbar being substantially L-shaped with a rounded edge bearing surface, said L-shape facing said third crossbar thereby presenting noncomplimentary geometries between said first and third crossbars to provide at least two lines of applied gripping pressure on said second looped end portion, and means within said sidewalls for resiliently urging said third crossbar into gripping engagement of said second looped portion.

2. The structure as recited in claim 1, wherein said second crossbar is offset from said first and third crossbar whereby a moment of forces is imparted to said belt adjuster when said belt and the looped end portions of said belt are under tension, said belt when under tension and in response to said moment of forces retaining a terminal end portion of said second looped end portion against the rounded edge bearing surface of said first crossbar whereby said second looped end portion is further gripped.

3. The structure of claim 2, wherein said sidewalls include means preventing twisting or sliding of said second looped end portion off said rounded edge bearing surface.